US007240893B2

(12) United States Patent
Komaba et al.

(10) Patent No.: US 7,240,893 B2
(45) Date of Patent: Jul. 10, 2007

(54) NORMALLY CLOSED SOLENOID VALVE

(75) Inventors: Takaaki Komaba, Tomi (JP); Takeshi Ohi, Tomi (JP)

(73) Assignee: Nissan Kogyo Co., Ltd., Nagano-ken (JP)

( * ) Notice: Subject to any disclaimer, the term of this patent is extended or adjusted under 35 U.S.C. 154(b) by 110 days.

(21) Appl. No.: 10/887,318

(22) Filed: Jul. 9, 2004

(65) Prior Publication Data
US 2005/0029478 A1    Feb. 10, 2005

(30) Foreign Application Priority Data
Jul. 11, 2003    (JP)    ............... 2003-273387

(51) Int. Cl.
*F16K 31/02*    (2006.01)
(52) U.S. Cl. ............... 251/129.04; 251/129.15; 251/337
(58) Field of Classification Search ........... 251/129.04, 251/129.15, 337
See application file for complete search history.

(56) References Cited

U.S. PATENT DOCUMENTS

| | | | | |
|---|---|---|---|---|
| 4,674,540 A | * | 6/1987 | Takei et al. ............ | 251/129.15 |
| 5,470,045 A | * | 11/1995 | Kazama et al. ........ | 251/129.15 |
| 5,537,960 A | * | 7/1996 | Izuo et al. ............ | 251/129.01 |
| 5,626,165 A | * | 5/1997 | Shinobu ............... | 251/129.15 |
| 5,711,342 A | * | 1/1998 | Kazama et al. ........ | 251/129.08 |
| 5,791,630 A | * | 8/1998 | Nakao et al. .......... | 251/129.15 |
| 6,076,550 A | | 6/2000 | Hiraishi et al. | |
| 6,242,994 B1 | * | 6/2001 | Li et al. .............. | 251/129.15 |
| 6,317,309 B1 | | 11/2001 | Baumann et al. | |
| 6,386,220 B1 | * | 5/2002 | Koenings ............. | 251/129.08 |
| 6,546,945 B2 | * | 4/2003 | Ishigaki et al. ........ | 251/129.15 |
| 6,691,651 B2 | * | 2/2004 | Yonekura et al. ...... | 251/129.01 |
| 6,737,766 B1 | * | 5/2004 | Burrola et al. ........ | 251/129.15 |
| 2002/0179874 A1 | | 12/2002 | Hofmann et al. | |

FOREIGN PATENT DOCUMENTS

FR    2.108.389    5/1972
JP    11-141723    5/1999

OTHER PUBLICATIONS

European Search Report dated Nov. 8, 2004.

* cited by examiner

*Primary Examiner*—John Bastianelli
(74) *Attorney, Agent, or Firm*—Greenblum & Bernstein, P.L.C.

(57) ABSTRACT

A normally closed solenoid valve includes a fixed core, a valve portion including a valve seat and a valve body, a movable core disposed between the fixed core and the valve seat, a resilient biasing member for biasing the movable core in a valve-closing direction and a coil. When energized, the coil generates an attracting force between the movable core and the fixed core against a biasing force by the resilient biasing member to cause the movable core to retreat from an initial position where the valve seat is in a closed state. When a characteristic graph line of spacing distance/attracting force that defines the attracting force in relation with a spacing distance between the fixed core and the movable core provides an inclination A (N/mm) at the initial position, the compression resiliency coefficient of the resilient biasing member is set to A (N/mm).

9 Claims, 3 Drawing Sheets

NORMALLY CLOSED SOLENOID VALVE

BACKGROUND OF THE INVENTION

1. Field of the Invention

The present invention relates to a normally closed solenoid valve provided with a valve body for opening and closing a flow path of a hydraulic fluid.

2. Background Art

Conventionally, there are two types of solenoid valves for opening and closing a flow path of a hydraulic fluid, one of which is a normally closed solenoid valve that is normally closed and is opened by excitation of a fixed core and a movable core when a current is rendered to flow into a coil, and the other of which is a normally open valve that is normally opened and is closed by excitation of a fixed core and a movable core when a current is rendered to flow into a coil. Such a normally closed solenoid valve is provided with a valve seat for opening and forming a flow path of a hydraulic fluid and a valve body formed at the tip end of a movable core capable of being brought into contact with the valve seat and moving away therefrom. In a demagnetized state, the movable core is seated on the valve body by a spring force of a spring member secured between the movable core and fixed core and is pressed into the direction of closing the valve. In a magnetized state where a current is rendered to flow into a coil, an attracting force works between the fixed core and movable core, and when the attracting force exceeds the spring force of the spring member, the valve body is separated from the valve seat, wherein the flow path of a hydraulic fluid can be opened. Herein, a force in which the attracting force and the spring force working in the direction opposite the attracting force are synthesized or composed is called a "thrust force" working on the movable core.

Such a normally closed solenoid valve is used for a fluid pressure control unit such as, for example, an anti-lock brake unit, etc., in a vehicle. In such a fluid pressure control unit, in order to use a normally closed solenoid valve in a high fluid pressure range, it was necessary to select a spring member having an intensive spring force in order to maintain a valve closed state against a high fluid pressure in a demagnetized state. Accordingly, if a spring member having an intensive spring force is selected, it was necessary to secure a great attracting force in order to secure a thrust force of the movable core against the spring force.

Therefore, the inventor, et al. commenced development of a normally closed solenoid valve that is able to set the attracting force to a greater level by increasing the area of the plane of the movable core opposed to the fixed core. Where a characteristic line S of spacing distance/attracting force is obtained in association with the attracting force thus obtained and the spacing distance between the fixed core and movable core, such a characteristic line as shown in FIG. 3 was obtained. The characteristic lines S1 and S2 of spacing distance/attracting force are based on the normally closed solenoid valve in which the attracting force is set to a greater level, and the characteristic line S3 of spacing distance/ attracting force is based on a prior art normally closed solenoid valve. As has been made clear from the characteristic lines shown in the same drawing, in the assembling allowance range from L1 to L2, the characteristic line S3 of spacing distance/attracting force produces almost the same attracting force, and the normally closed solenoid valve in the assembling allowance range produces almost the same initial performance. However, the characteristic lines S1 and S2 of spacing distance/attracting force produce steep slopes, and even in the assembling allowance range, there is a comparatively large difference in the initial performance. That is, a difference will be brought about in the initial thrust force of the normally closed solenoid valve in an assembled state. (See JP-A-11-141723.)

SUMMARY OF THE INVENTION

It is therefore an object of the present invention to provide a normally closed solenoid valve in which the thrust force of a movable core working against a resilient biasing member in the initial position or assembling allowance range is fixed.

To achieve the object, the invention provides a normally closed solenoid valve, includes: a fixed core; a valve portion for opening and closing a flow path of a hydraulic fluid, the valve portion including a valve seat and a valve body disposed opposed to the valve seat to be seated therein; a movable core disposed between the fixed core and the valve seat, which is capable of advancing and retreating along with the valve body with respect to the valve seat; a resilient biasing member for biasing the movable core in a valve-closing direction along which the valve body is seated in the valve seat for closing the valve; and a coil for generating an attracting force between the movable core and the fixed core when energized to cause the movable core to retreat in a valve-opening direction from an initial position thereof where the valve portion is in a closed state, the attracting force acted against an biasing force exerted by the resilient biasing member. When a characteristic graph line of spacing distance/attracting force that defines the attracting force in relation with a spacing distance between the fixed core and the movable core provides an inclination A (N/mm) at the initial position, the compression resiliency coefficient of the resilient biasing member is set to A (N/mm).

According to this aspect of the invention, even if there are more or less differences in the initial positions of respective products, the initial thrust force of the movable core can be made constant only by setting the compression resiliency coefficient of a resilient biasing member when the attracting force of the movable core is increased by widening the areas of respective opposed planes of the fixed core and movable core. Therefore, even in a case where the current value to be supplied to the coil by current controlling means is made variable, it is possible to obtain a planned initial thrust force of the movable core, wherein respective products are freed from any unevenness. Further, since the compression resiliency coefficient, to be established, of a resilient biasing member can be obtained by securing the characteristic line of spacing distance between a fixed core and a movable core and the attracting force thereof in advance, the compression resiliency coefficient can be securely established.

The invention provides a normally closed solenoid valve, including: a fixed core; a valve portion for opening and closing a flow path of a hydraulic fluid, the valve portion including a valve seat and a valve body disposed opposed to the valve seat to be seated therein; a movable core disposed between the fixed core and the valve seat, which is capable of advancing and retreating along with the valve body with respect to the valve seat; a resilient biasing member for biasing the movable core in a valve-closing direction along which the valve body is seated in the valve seat for closing the valve; and a coil for generating an attracting force between the movable core and the fixed core when energized to cause the movable core to retreat in a valve-opening direction from an initial position thereof where the valve portion is in a closed state, the attracting force acted against a biasing force exerted by the resilient biasing member.

When an assembling allowance range of a spacing distance between the fixed core and the movable core at the initial position is established, a characteristic graph line of spacing distance/attracting force is defined for expressing a relation between the attracting force and the spacing distance, and the characteristic graph line provides attracting forces at a minimum spacing distance and a maximum spacing distance within the assembling allowance range, which are connectable by a straight line having an inclination A (N/mm), the compression resiliency coefficient of the resilient biasing member in the assembling allowance range is set to A (N/mm).

With the structure as described above, it is possible to obtain a rough inclination even if the characteristic line of the spacing distance and attracting force in the assembling allowance range is not straight, and it is possible to make constant the thrust force of the movable core, which works against the biasing force of a resilient biasing member, in the assembling allowance range. Therefore, in the normally closed solenoid valve assembled in the assembling allowance range, it is possible to make roughly constant the initial thrust force of at least the movable core, wherein respective products will be almost freed from any unevenness. In addition, even in a case where the current value supplied to the coil is made variable by current controlling means, it is possible to secure a planned initial thrust force of the movable core, wherein the respective products will be free from any unevenness.

Preferably, the valve body is separately formed with the movable core and is engaged and fixed to a tip ends of the movable core disposed on a valve seat side of the movable core.

With the structure as described above, the valve body for which precise machining is required and a movable core which is long-sized and is comparatively easily machined may be produced in separate processes, whereby an efficiency can be achieved in the machining processes.

Preferably, the resilient biasing member is a spring member; and the compression resiliency coefficient is a spring constant of the spring member.

By this, even when the thrust force of a movable core is increased by widening the area of a surface opposed to the movable core, it is possible to make constant the initial thrust force in the initial position of the movable core by selecting or producing a spring member having a spring constant fitted to the characteristic line of spacing distance and thrust force.

BRIEF DESCRIPTION OF THE DRAWINGS

The present invention may be more readily described with reference to the accompanying drawings, in which.

DETAILED DESCRIPTION OF THE PREFERRED EMBODIMENTS

Hereinafter, a detailed description is given of embodiments of the invention with reference to the drawings.

Figure 1:
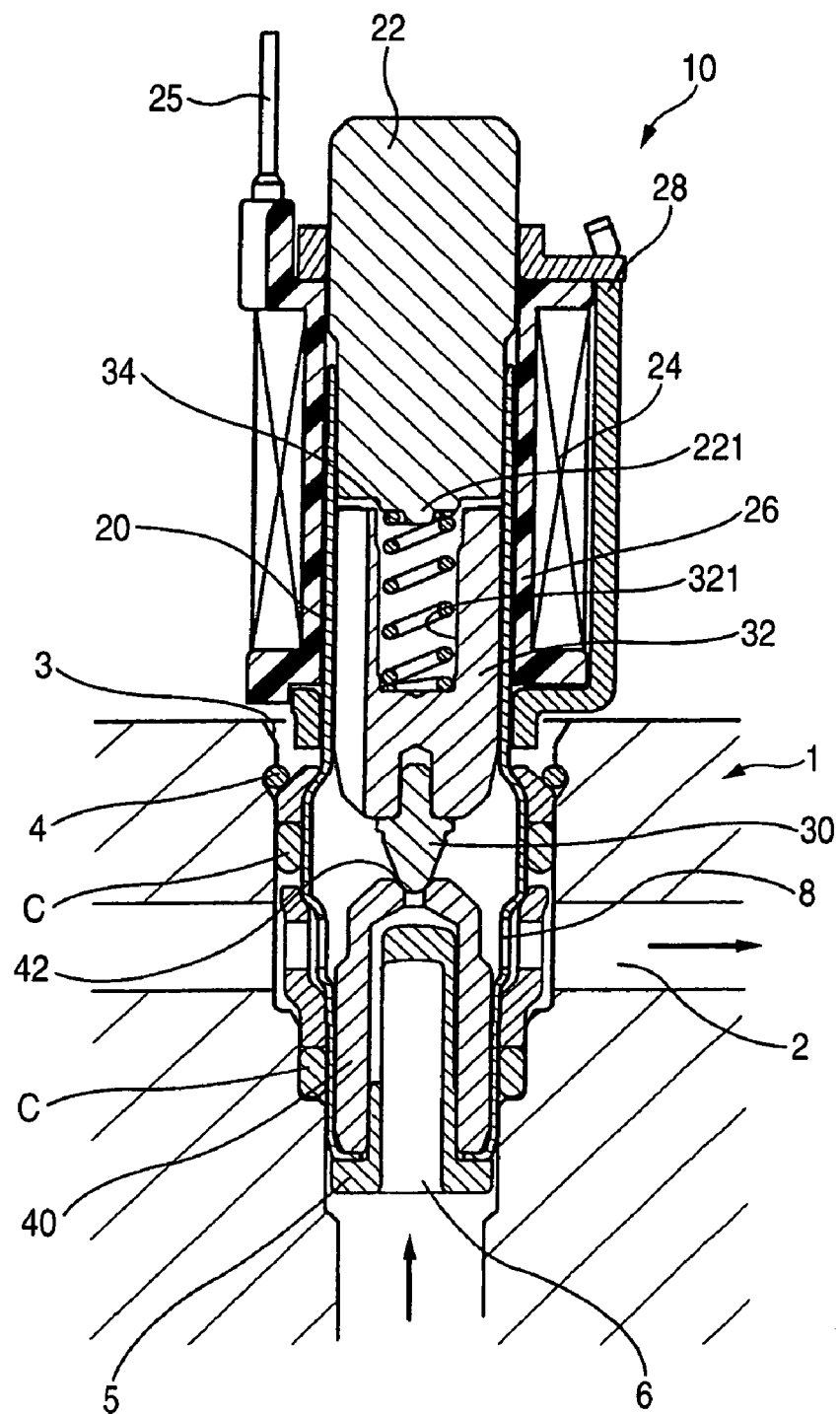
FIG. 1 is a longitudinal sectional view of a normally closed solenoid valve according to one preferred embodiment of the invention.
Figure 2:
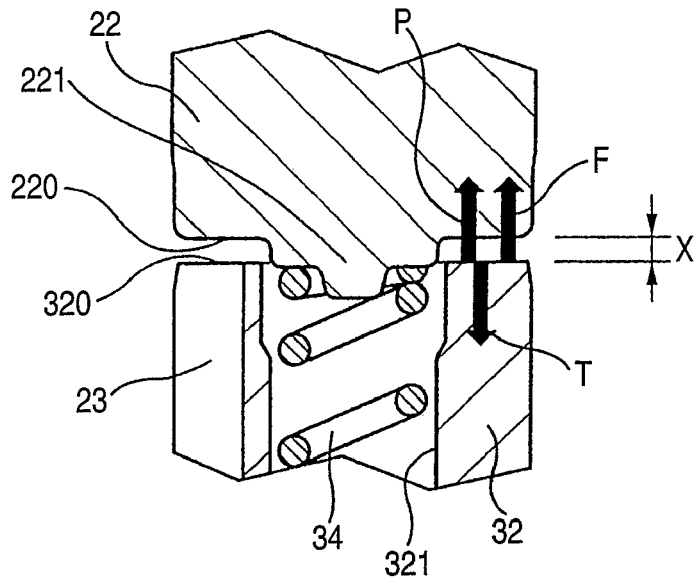
FIG. 2 is a partially enlarged longitudinal sectional view of the movable core and fixed core.
Figure 3:
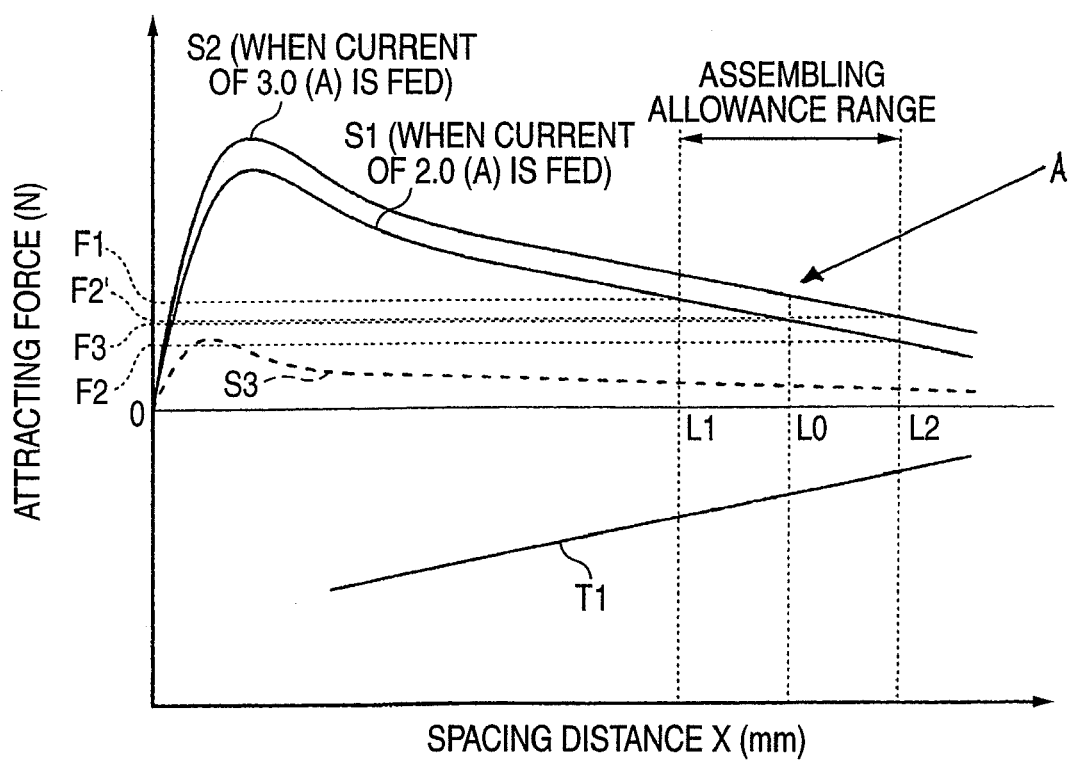
FIG. 3 is a graph showing the characteristic lines of spacing distance/attracting force of the normally closed solenoid valve and the characteristic line of spacing distance/spring force thereof.
Figure 4:
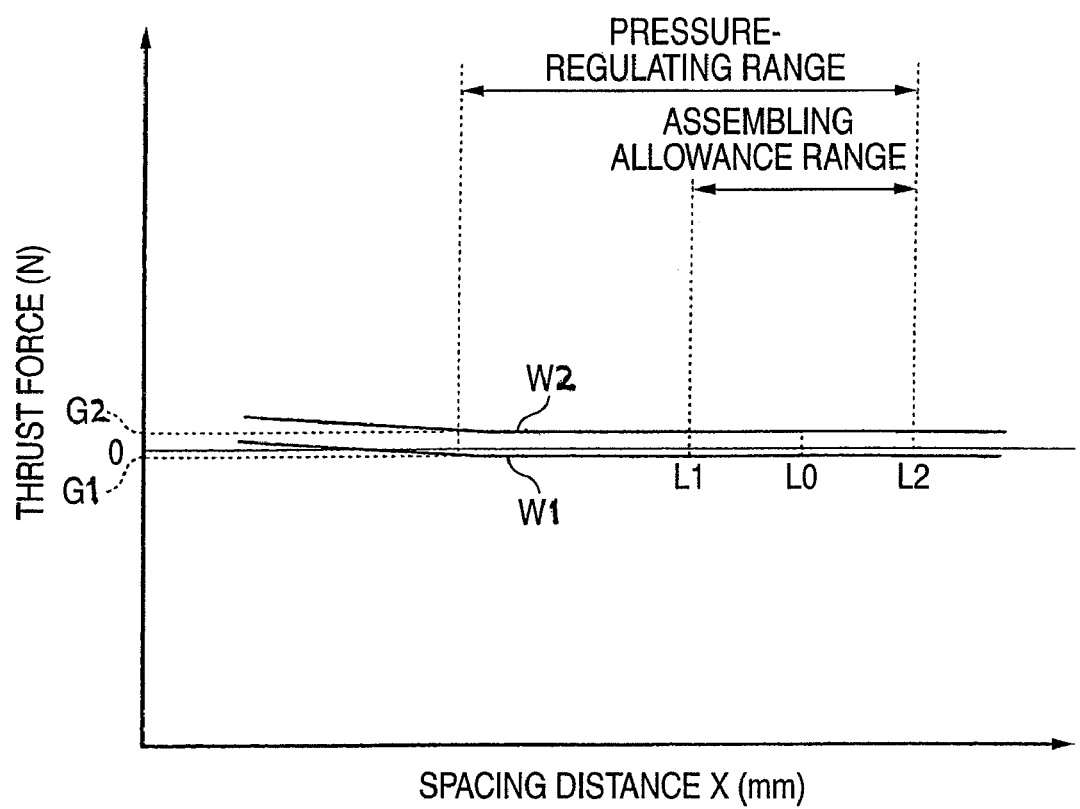
FIG. 4 is a graph showing the characteristic line of spacing distance/thrust force of the normally closed solenoid valve according to one embodiment of the invention.

FIG. 1 is a longitudinal sectional view of a normally closed solenoid valve according to one embodiment of the invention, FIG. 2 is a partially enlarged longitudinal section view of a movable core and a fixed core, FIG. 3 is a graph showing the characteristic lines of spacing distance and thrust force of the normally closed solenoid valve and characteristic lines of spacing distance and spring force thereof, and FIG. 4 is a graph showing the characteristic line of spacing distance and thrust force of a normally closed solenoid valve according to one embodiment of the invention.

(Structure of a Normally Closed Solenoid Valve)

As shown in FIG. 1, a solenoid valve according to one embodiment of the invention is a normally closed solenoid valve 10 for opening and closing a flow path of a hydraulic fluid of, for example, an anti-lock brake system (ABS) for a vehicle.

The normally closed solenoid valve 10 includes a thin cylindrical body 20 which is inserted into the attachment hole 3 of the base material 1 and is fixed by a fastener 4 so as not to come off, a fixed core 22 fixed at one end of the body 20, a coil 24 for exciting or magnetizing the fixed core 22 by feeding a current, a valve body 30 disposed opposite a valve seat 42 so as to be seated thereon and working together with the valve seat 42 as a valve portion for opening and closing a flow path of a hydraulic fluid, a movable core 32 disposed between the fixed core 22 and the valve seat so as to advance and retreat along with the valve body 30 with respect to the valve seat, and a spring member 34, which is disposed between the fixed core 22 and the movable core 32, functioning as a resilient biasing member for biasing the movable core 32 in the closing direction with the valve body 30 seated in the valve seat 42. The coil 24 is electrically connected via a terminal 25 to current controlling means (not illustrated) which controls the current value to be supplied to the coil 24. The coil 24 generates an attracting force between the movable core 32 and the fixed core 22 by being energized, and causes the movable core 32 to retreat in the valve-opening direction against the spring force working as the biasing force of the spring member 34 from the initial position of a closed state thereof.

(Body)

The body 20 is thin and cylindrical, and has the fixed core 22 provided at one end thereof and the valve seat body 40 fixed inside the other end thereof. The movable core 32 is disposed so as to advance and retreat between the fixed core 22 and the valve seat body 40, and the other end thereof on which the valve seat body 40 is fixed is inserted into amounting hole 3 of the base material 1. The outer circumferential surface at the other end side of the body 20 is sealed in a fluid-tight state with respect to a hydraulic fluid by a plurality of annular sealing members between the base material 1 and the mounting hole 3. The body 20 has an inlet port 6 and an outlet port 8, which are open to the hydraulic fluid flow path 2 formed in the base material 1. A filtering member 5 and the cylindrical valve seat body 40 are mounted in the inlet port 6. A coil 24 wound on a resin-made bobbin 26 and a coil case 28 to cover up the outside of the coil 24 are attached to the outside of the body 20 protruding from the base material 1 to the exterior.

(Fixed Core)

The fixed core 22 is made of a magnetic material and is roughly cylindrical. Almost the half part of the outer circumferential plane is inserted into the interior of the body 20 and is welded to and fixed at the body 20. A projection 221 with which one end of the spring member 34 is brought into contact is formed at the center of the tip end at the body 20 side of the fixed core 22.

(Movable Core)

The movable core 32 is made of a magnetic material and is roughly cylindrical. A recess portion 321 having a circular cross-section is formed to open at one end part opposed to the fixed core 22. The valve body 30 is pressure-fitted to the other tapered end opposed to the valve seat body 40. The spring member 34 is brought into contact with the bottom part of the recess portion 321 and is disposed in the recess portion 321. Therefore, the spring member 34 has one end thereof brought into contact with the inside of the recess portion 321 of the movable core 32 and has the other end thereof brought into contact with the projection 221 of the fixed core 22. The open end of the recess portion 321 of the movable core 32 is formed to be larger than the outer diameter of the projection 221 of the fixed core 22, and accommodates the projection 221 when the movable core 32 and the fixed core 22 are adsorbed to each other.

(Valve Body)

The valve body 30 has a tapered and roughly conical shape, the tip end of which is spherical, and is brought into contact with the funnel-shaped valve seat 42 formed at a small-diameter opening part of the valve seat body 40 to close the valve. In a demagnetized state where the coil 24 is not excited, the spring force of the spring member 34 is set to a spring force level, at which the valve body 30 can be seated on the valve seat 42, against the fluid pressure of a hydraulic fluid applied to the sealing area of the closed valve body 30. That is, the fixed core 22 and the movable core 32 are assembled together with the spring member 34 placed therebetween and with a prescribed spring force generated.

In an assembling work step in the production process of the normally closed solenoid valve 10, the fixed core 22 and the movable core 32 are assembled after the spacing distance X between the fixed core 22 and the movable core 32 is adjusted so as to enter an assembling allowance range determined in advance.

(Operation of the Normally Closed Solenoid Valve)

Hereinafter, a description is given of operations of the normally closed solenoid valve 10 according to the embodiments.

(Demagnetized State)

In a demagnetized state where no current is supplied to the coil 24, the fixed core 22 is not excited, wherein the movable core 32 is located at the initial position as shown in FIG. 1, and is pressed in the valve-closing direction by a spring force of the spring member 34. The valve body 30 is brought into contact with the valve seat 42 and is seated and disposed therein, wherein a closed state of the valve is maintained. Therefore, a hydraulic fluid does not flow in the demagnetized state because the inlet port 6 does not communicate with the outlet port S.

(Magnetized State)

If a current is fed from current controlling means (not illustrated) to the coil 24, and the fixed core 22 is excited, an attracting force is generated between the fixed core 22 and the movable core 32, and the movable core 32 is caused to retreat to the fixed core 22 side against the spring force of the spring member 34, wherein the valve body 30 is separated from the valve seat 42 and disposed apart therefrom. Therefore, in a state where a current is fed to the coil 24, a hydraulic fluid flows from the inlet port 6 into the outlet port 8.

(Pressure-Regulated State)

It is possible to control the fluid pressure of a hydraulic fluid at the outlet port 8 side of the normally closed solenoid valve 10 by controlling the amperage of the current fed to the coil 24. The current controlling means (not illustrated) controls the amperage of the current fed to the coil 24 in compliance with signals coming from a pressure sensor (not illustrated) which is disposed at, for example, the outlet port 8 side. By controlling the current amperage to the coil 24, the intensity of the attracting force working on the movable core 32 can be controlled. The thrust force of the movable core 32 is determined by the attracting force and spring force, wherein it is possible to balance the thrust force and the fluid pressure of the hydraulic fluid. Therefore, by controlling the intensity of the attracting force, the spacing distance between the fixed core 22 and the movable core 32, that is, the valve-opening amount can be adjusted, thereby controlling the fluid pressure of the hydraulic fluid flown to the outlet port 8 side.

(Force Working on the Fixed Core)

As shown in FIG. 2, an attracting force F brought about by excitation, spring force T brought about by the spring member 34, and fluid pressure P of a hydraulic fluid applied onto the valve body 30 work on the movable core 32. As described above, in a demagnetized state, no attracting force F is generated between the fixed core 22 and the movable core 32, an unequal Fluid pressure P<Spring force T is obtained, wherein a valve closed state is maintained. And, if a current is fed to the coil 24 by the current controlling means (not illustrated), the attracting force F works in the direction along which the fixed core 22 absorbs the movable core 32, wherein an unequal Attracting force F+Fluid pressure P>Spring force T is brought about, and the spring member 34 is compressed to open the valve body 30.

In the present embodiment, the spring force is set to 15 (N) when the valve is closed in a demagnetized state, in compliance with the use requirement of the normally closed solenoid valve in which the fluid pressure is set to, for example, 11 (N) or more which is higher than in prior arts. And, if the area of the plane 320 opposed to the movable core 32 which is opposed to the fixed core 22 is increased in response thereto, it becomes possible to generate a higher attracting force F. Also, the attracting force F can be varied by the current amperage (A) fed from the current controlling means (not illustrated) to the coil 24. In addition, the attracting force F working on the movable core 32 is varied in accordance with the spacing distance X between the fixed core 22 and the movable core 32, in further detail, in accordance with the spacing distance X between the respective planes 220 and 320 opposed to each other of the fixed core 22 and the movable core 32.

(Characteristics of Spacing Distance-Attracting Force)

Next, using FIG. 3, a description is given of the characteristic line of spacing distance between the fixed core 22 and movable core 32 and attracting force in a normally closed solenoid valve 10 according to the present invention.

FIG. 3 is a view showing the characteristic lines of spacing distance and attracting force of the normally closed solenoid valve 10, wherein an axis x indicates the spacing distances X between the plane 220 of the fixed core and the plane 320 of the movable core 32, and an axis y indicates attracting forces F working on the plane 320 of the movable core 32 by feeding a current to the coil 24. The spacing distance X of axis x varies from the initial position L0 of the reference to the retreated position 0 in line with retraction of the movable core 32 to the fixed core 22 side by a current fed to the coil 24. The initial position L0 of the spacing distance X means the spacing distance between the fixed core 22 and the movable core 32 when the valve body 30 is brought into contact with the valve seat body 42 and the valve is closed. The retreated position 0 means the spacing distance between the fixed core 22 and the movable core 32 in a state where the valve body 30 is separated from the valve seat body 42 and the valve is opened, and where the movable core 32 is adsorbed to the fixed core 22. In an actual normally closed solenoid valve 10, the initial position is produced so as to be placed within a scope of the assembling allowance range (L1 to L2) with respect to the reference initial position L0, which is determined in advance. Accordingly, the initial position may change more or less in the assembling allowance range in respective normally closed solenoid valves 10 that are actually produced.

As shown in FIG. 3, in the characteristic line S3 of spacing distance/attracting force of a prior art normally closed solenoid valve, the initial attracting force has almost fixed attracting force in the assembling allowance range L1 to L2 including the reference initial position L0. Therefore, it was possible to easily establish the initial thrust force of the normally closed solenoid valve.

FIG. 3 shows the characteristic lines S1 and S2 of spacing distance/attracting force when currents 2.0 (A) and 3.0 (A) are flown to the coil 24 of the normally closed solenoid valve 10 according to the present embodiment. The characteristic lines S1 and S2 of spacing distance/attracting force have comparatively large inclinations in the assembling allowance range L1 to L2.

The characteristic line S1 of spacing distance/attracting force shows that, when the spacing distance X between the fixed core 22 and the movable core 32 is L0 (mm) in the assembled state of the so-called initial state, the initial attracting force F is F3 (N) when a current flows to the coil. For example, in the present embodiment, L0 is 0.37 (mm) and F3 is 13 (N). However, the assembling allowance is ±(L0−L1) or ±(L2−L0), for example, 0.07 (mm) with respect to L0 when the normally closed solenoid valve 10 is assembled, and in the assembling allowance range, the initial attracting force F has a difference of (F1−F2), for example, 2 (N). That is, even if a normally closed solenoid valve 10 is satisfactory, the allowance of which is in the assembling allowance range, the initial attracting force may change in each product when a current is caused to flow to the coil 24.

The characteristic line S1 of spacing distance/attracting force is a straight line in which the inclination in the assembling allowance range is almost fixed, and the inclination of the straight line can be expressed by A=(F2−F1)/(L2−L1). Therefore, in the present embodiment, for example, it is possible to obtain an inclination of A=−2/0.14=−14.29 (N/mm).

Therefore, in the embodiment according to the invention, the compression resiliency coefficient of the spring member 34, the so-called spring constant is set to an inclination A, for example, −14.29 (N/mm). As shown in FIG. 2, the spring force T of the spring member 34 works in the direction of separating the fixed core 22 from the movable core 32, that is, in the direction opposed to the attracting force F. Also, with respect to the spring force T of the spring member 34, the spring member 34 is compressed in line with a decrease in the spacing distance X, wherein a greater force is generated. The spring force of the spring member, for which an inclination of the spring constant is set to A (N/mm), has a characteristic shown as the characteristic line T1 of spacing distance/spring force shown in FIG. 3. As has been expressed by the characteristic line T1 of spacing distance/spring force, the spring force T of the spring member 34 is increased in a negative direction (that is, in a reverse direction of the attracting force of the movable core) in line with a decrease in the spacing distance X.

Also, where the characteristic line S of spacing distance/attracting force in the assembling allowance range is not straight, a straight line connecting the attracting force F1 at the minimum value L1 to the attracting force F2 of the maximum value L2 in the assembling allowance range is obtained, and the inclination of the straight line is made into A, whereby it is possible to establish the spring constant. In addition, it may be calculated by acquiring an equation of the characteristic line S1 of spacing distance/attracting force and differentiating the inclination at the reference initial position L0 of the movable core 32.

Further, as shown in FIG. 3, it is found that the characteristic line S2 of spacing distance/attracting force when current amperage of 3.0 (A) is fed to the coil 24 has an inclination A as in the characteristic line S1.

(Characteristic Line of Spacing Distance/Attracting Force)

FIG. 4 shows characteristic lines W1 and W2 of spacing distance/thrust force, which are obtained by synthesizing the characteristic lines S1 and S2 of spacing distance/attracting force shown in FIG. 3 and the characteristic line T1 of spacing distance/spring force. The characteristic line W1 of spacing distance/attracting force is obtained by synthesizing the characteristic line S1 of spacing distance/attracting force and the characteristic line T1 of spacing distance/spring force, and the characteristic line W2 of spacing distance/attracting force is obtained by synthesizing the characteristic line S2 of spacing distance/attracting force and the characteristic line T1 of spacing distance/spring force. Thus, by synthesizing the characteristic lines of the attracting force F of the movable core 32 and the spring force T of the spring member 34, the characteristic lines W1 and W2 of spacing distance/thrust force of the normally closed solenoid valve 10 in which a spring member 34 is actually incorporated can be obtained. These characteristic lines W1 and W2 are almost straight in at least the assembling allowance range, wherein it is understood that attracting forces G1 and G2 can be obtained, respectively. Therefore, in normally closed solenoid valves produced in the assembling allowance range (L1 to L2), the initial thrust forces G1 and G2, which are generated at the initial position of the movable core 32 when a current is fed to the coil 24, will become almost constant.

Also, where the amperage of a current fed from the current controlling means to the coil 24 is variably controlled, it is possible to obtain a prescribed thrust force G of the movable core 32 corresponding to the prescribed amperage. Therefore, reliable control can be carried out. For example, a normally closed solenoid valve 10 that has been assembled at the initial position L1 where a current whose amperage is 2.0 (A) is supplied to the coil 24 generates an initial thrust force G1, wherein the movable core 32 is adsorbed to the fixed core 22 side and the valve body 30 is closed. And, the current controlling means controls the amperage to 3.0 (A) on the basis of a signal from a pressure sensor secured at the hydraulic fluid path 2 at the outlet port 8 side, the thrust force of the movable core 32 is controlled to G2 if the spacing distance X is in a regulating range shown in FIG. 4. As the thrust force of the movable core 32 becomes G2, the valve body 30 equivalently moves in the valve closing direction against the fluid pressure P to throttle the valve opening degree, wherein it is possible to lower the fluid pressure P in the hydraulic fluid path 2 at the outlet port side. As shown in FIG. 4, with respect to the pressure regulating range of the spacing distance X, it is possible to set a prescribed fluid pressure at the outlet port 8 side by controlling the current amperage if the characteristic lines W1 and W2 of spacing distance/thrust force are almost in a straight range and the spacing distance X is in a pressure-regulating range.

Thus, in the normally closed solenoid valve 10 according to the present embodiment of the invention, the assembling allowance range of the spacing distance X between the fixed core 22 and the movable core 32 when no current is fed to the coil 24 is first established, and the characteristic line S of spacing distance/attracting force of the fixed core 22 and movable core 32 is obtained without taking the spring force of the spring member 34 in to consideration. Next, the inclination A (N/mm) of the characteristic line S of spacing distance/attracting force in the assembling allowance range is obtained, a spring member 34 in which the inclination of the characteristic line T of spacing distance/spring force in the assembling allowance range when no current is fed, the so-called spring constant, is set to A (N/mm) is produced or selected, and the normally closed solenoid valve 10 is assembled. The normally closed solenoid valve 10 thus produced shows a constant thrust force at least when the characteristic line W of spacing distance/thrust force is in the assembling allowance range. Accordingly, in the normally closed solenoid valve 10 assembled with the reference initial position L0 in the assembling allowance range, the initial thrust force becomes constant.

In addition, the present invention is not limited to the present embodiment. It maybe subject to modification in various embodiments within the scope of the invention.

For example, as for the spring member 34, it is possible to choose a resilient body having a constant resiliency coefficient other than a spring. At this time, it is possible to select the resiliency coefficient as in selecting the spring constant.

Also, an integral type valve body in which the tip end of the movable core 32 is tapered may be formed instead of the valve body 30 separately formed from the movable core 32.

What is claimed is:

1. A normally closed solenoid valve, comprising:
a fixed core;
a valve portion for opening and closing a flow path of a hydraulic fluid, the valve portion including a valve seat and a valve body disposed opposed to the valve seat to be seated therein;
a movable core disposed between the fixed core and the valve seat; which is capable of advancing and retreating along with the valve body with respect to the valve seat;
a resilient biasing member for biasing the movable core in a valve-closing direction along which the valve body is seated in the valve seat for closing the valve; and
a coil for generating an attracting force between the movable core and the fixed core when energized to cause the movable core to retreat in a valve-opening direction from an initial position thereof where the valve portion is in a closed state, the attracting force acted against a biasing force exerted by the resilient biasing member;

wherein, a characteristic graph line of spacing distance/attracting force that defines the attracting force in relation with a spacing distance between the fixed core and the movable core provides a slope A(N/mm) in an assembly allowance range, and the compression resiliency coefficient of the resilient biasing member is substantially the slope A(N/mm), such that the biasing force of the resilient biasing member has an oppositely directed and substantially equal force to the attracting force over the assembling allowance range, wherein the resilient biasing member is a spring member, wherein the compression resiliency coefficient is a spring constant of the spring member, and wherein the spacing distance between the fixed core and the movable core is measured in a direction of movement of the movable core.

2. The normally closed solenoid valve according to claim 1, wherein the valve body is separately formed with the movable core and is engaged and fixed to a tip ends of the movable core on a valve seat side of the movable core.

3. A normally closed solenoid valve, comprising:
a fixed core;
a valve portion for opening and closing a flow path of a hydraulic fluid, the valve portion including a valve seat and a valve body disposed opposed to the valve seat to be seated therein;
a movable core disposed between the fixed core and the valve seat, which is capable of advancing and retreating along with the valve body with respect to the valve seat;
a resilient biasing member for biasing the movable core in a valve-closing direction along which the valve body is seated in the valve seat for closing the valve; and
a coil for generating an attracting force between the movable core and the fixed core when energized to cause the movable core to retreat in a valve-opening direction from an initial position thereof where the valve portion is in a closed state, the attracting force acted against a biasing force exerted by the resilient biasing member;

wherein, an assembling allowance range of a spacing distance between the fixed core and the movable core at the initial position is established, a characteristic graph line of spacing distance/attracting force is defined for expressing a relation between the attracting force and the spacing distance, and the characteristic graph line provides attracting forces at a minimum spacing distance $L_1$ and a maximum spacing distance $L_2$ within the assembling allowance range, which are connectable by a straight line having a slope A (N/mm), and the compression resiliency coefficient of the resilient biasing member in the assembling allowance range is substantially the slope A (N/mm), such that the biasing force of the resilient biasing member has an oppositely directed and substantially equal force to the attracting force over the assembling allowance range.

4. The normally closed solenoid valve according to claim 3, wherein the valve body is separately formed with the movable core and is engaged and fixed to a tip ends of the movable core disposed on a valve seat side of the movable core.

5. The normally closed solenoid valve according to claim 3, wherein the resilient biasing member is a spring member; and the compression resiliency coefficient is a spring constant of the spring member.

6. The normally closed solenoid valve according to claim 3, wherein the fixed core comprises a projection and the movable core comprises a recess and wherein, in the initial position, the projection extends into the recess.

7. The normally closed solenoid valve according to claim 1, wherein the fixed core comprises a projection and the movable core comprises a recess and wherein, in the initial position, the projection extends into the recess.

8. The normally closed solenoid valve according to claim 1, wherein the attracting force is an electromagnetic force.

9. The normally closed solenoid valve according to claim 3, wherein the attracting force is an electromagnetic force.

* * * * *